US007120635B2

(12) United States Patent
Bhide et al.

(10) Patent No.: US 7,120,635 B2
(45) Date of Patent: Oct. 10, 2006

(54) EVENT-BASED DATABASE ACCESS EXECUTION

(75) Inventors: Manish Anand Bhide, New Delhi (IN); Mukesh Kumar Mohania, New Delhi (IN)

(73) Assignee: International Business Machines Corporation, Armonk, NY (US)

(*) Notice: Subject to any disclaimer, the term of this patent is extended or adjusted under 35 U.S.C. 154(b) by 466 days.

(21) Appl. No.: 10/319,980

(22) Filed: Dec. 16, 2002

(65) Prior Publication Data

US 2004/0117371 A1 Jun. 17, 2004

(51) Int. Cl.
*G06F 17/30* (2006.01)
(52) U.S. Cl. ............... 707/9; 707/2; 707/6; 707/101
(58) Field of Classification Search ............ 707/1–10, 707/101
See application file for complete search history.

(56) References Cited

U.S. PATENT DOCUMENTS

| 6,061,684 | A | 5/2000 | Glasser et al. | |
|---|---|---|---|---|
| 6,484,261 | B1* | 11/2002 | Wiegel ................. | 713/201 |
| 6,820,082 | B1* | 11/2004 | Cook et al. .......... | 707/9 |
| 2002/0144142 | A1* | 10/2002 | Shohat ................. | 713/200 |
| 2002/0178271 | A1* | 11/2002 | Graham et al. ...... | 709/229 |
| 2003/0037263 | A1* | 2/2003 | Kamat et al. ....... | 713/202 |
| 2003/0115484 | A1* | 6/2003 | Moriconi et al. .... | 713/201 |
| 2004/0019809 | A1* | 1/2004 | Sheinis et al. ....... | 713/202 |

OTHER PUBLICATIONS

Giuri et al., "Role templates for content-based access control", Proceedings of the second ACM workshop on Role-based access control, Fairfax, Virginia, United States pp. 153-159, Year of Publication: 1997.*

Agrawal Rakesh and Srikant Ramakrishnan, Fast Algorithms for Mining Association Rules, Proceedings of the 20th International Conference on Very Large Arrays, 1994.

Edjlali Guy, Acharya Anurag and Chaudhary Vipin, History-based Access Control for Mobile Code, ACM Conference on Computers and Communications Security 1998, Nov. 5-8, 1998.

Pang Kenneth K, Fine-Grained Event-Based Access Control, Lotus Research Technical Report #98.05, 1998, Lotus Development Coprporation, 55 Cambridge Parkway, Cambridge, MA 02142.

* cited by examiner

*Primary Examiner*—Khanh B. Pham
(74) *Attorney, Agent, or Firm*—Gibb I.P. Law Firm, LLC; Pete Tennent, Esq.

(57) ABSTRACT

An authorisation privilege for an access request is inferred when no explicit privilege exists. The inference can be performed by way of mining occurrence patterns or derived from user hierarchy, profile, click history, transaction history or role. For any access request, the respective explicit privilege or inferred privilege is verified by the database or security administrator before the access request is permitted. Conditions expressed in an access policy are evaluated on the occurrence of predefined events. The events extend beyond user access requests, and include external events, composite events and access of a referential type. The access policy is framed in 'event, condition, access enforcement' terminology. The access control rules can be parameterised and can be instantiated by data obtained from inference rules associated with the conditions of the policy. The conditions have an evaluation component and an inference component. The access privileges supported are: read, write and indirect read. An indirect read operation typically allows a user qualified access to one or more portions of a database, but not the entire database.

21 Claims, 5 Drawing Sheets

EVENT-BASED DATABASE ACCESS EXECUTION

FIELD OF THE INVENTION

The invention relates the execution of event-based database access requests.

BACKGROUND

Access control functionality is one of the most crucial parts of any database application. Access control privileges are generally statically defined in terms of rules. An example of such an approach is taught in a paper entitled "History-based Access Control for Mobile Code", by Guy Edjlati, Anurag Acharya and Vipin Chaudhary, published as proceedings of the ACM Conference on Computer and Communications Security 1998: 28–48. The key idea behind history-based access control is to maintain a selective history to improve the differentiation between safe and potentially dangerous requests. An example is a policy that allows a user to connect to a remote site if and only if it has neither tried to open a local file that it has not created, nor tried to modify a file it has created, nor tried to create a sub-process.

Because these rules (or rights), exemplified by Edjlali et al are fixed, they are not reactive to the changing state of the database. Such functionality can be added using an event-based access control system. In an event-based access control system, contingent access policies are used. Key to an event-based access control system is the idea of multiple states. Events trigger state transitions. The events can be, for example, the arrival of an object, the completion of a process, or the passage of time (such as a deadline). In each state, users may have different access rights to the system: at one state time User A has read and write access, but at another state time may only have read access.

A particular problem arises when an access request does not have a recognisable authorisation (or permission). Such a request may lead to refusal from the viewpoint of a database administrator.

A known arrangement for dealing with a similar problem is taught in U.S. Pat. No. 6,061,684 (Glasser et al), issued on May 9, 2000. Glasser et al teaches that in the absence of a relevant access control list, a nearest ("proximate") ancestor element is located, and the control list of that ancestor is inherited. Specifically Glasser et al uses the example of a file system hierarchy having folders whose access permissions can be set. Each folder can, but need not, have an Access Control List. A folder's access permissions can be inherited by its descendants in the hierarchy, however—in the example given—inheritance does not proceed beyond the nearest ancestor having an ACL. If no ancestor is present, then it is possible that the access request will be refused.

Another issue relates to the dynamic modification of access rights. In conventional access control systems having statically defined rules, dynamism is achieved by associating conditions with the access control policy (eg. Edjlali et al). These conditions are evaluated when the user makes an access request. For an events-based access control system, on the other hand, the access rights are changed on the occurrence of predefined events. By way of example, users are ascribed roles. Roles, in turn, are mapped to rights (or privileges) according to a series of rules that are contingent upon events. An example of an event not related to a user request is data being inserted or modified in a database.

The conditions associated with the policy are evaluated on the occurrence of events beyond user access requests. Therefore, when a user makes repeated data access requests, that request is tested against the policy in force at the particular instant of time. The policy may have changed in the period between subsequent requests.

A known arrangement of this type is taught in Technical Report No. 1998.05, entitled "Fine-Grained Event-Based Access Control", by Kenneth K. Pang, published by Lotus Development Corporation, 55 Cambridge Parkway, Cambridge, Mass. 02142. Pang describes an arrangement suited to a process having the properties of user rights depending on time and the roles the users assume. The roles depend upon the requested object (eg. a document or file). Pang has only a limited set of events that can impact on a user's rights at any one time. Specifically, it is the role the user has assumed for the document (ie. object) it wishes to access, and a time function.

SUMMARY

The invention rests on the idea of inferring an authorisation privilege for an access request when no explicit privilege exists. The inference can be performed by way of mining occurrence patterns or derived for user hierarchy, profile, click history, transaction history or role. For any access request, the respective explicit privilege or inferred privilege is verified by the database or security administrator before the access request is permitted.

The invention is further concerned with evaluating conditions expressed in an access policy on the occurrence of predefined events. The events extend beyond user access requests, and include external events, composite events and access of a referential type. The policy is framed in terms of: 'event, condition, access enforcement' terminology.

The access control rules can be parameterised and can be instantiated by data obtained from inference rules associated with the conditions of the policy. The conditions have an evaluation component and an inference component.

The access privileges supported are: read, write and indirect read. An indirect read operation typically allows a user qualified access to one or more portions of a database, but not the entire database.

DETAILED DESCRIPTION

A method, a computer system and a computer program product are described hereinafter for the execution of event-based access control with support for inference of access rights.

Access Control Policy Model

Figure 1:
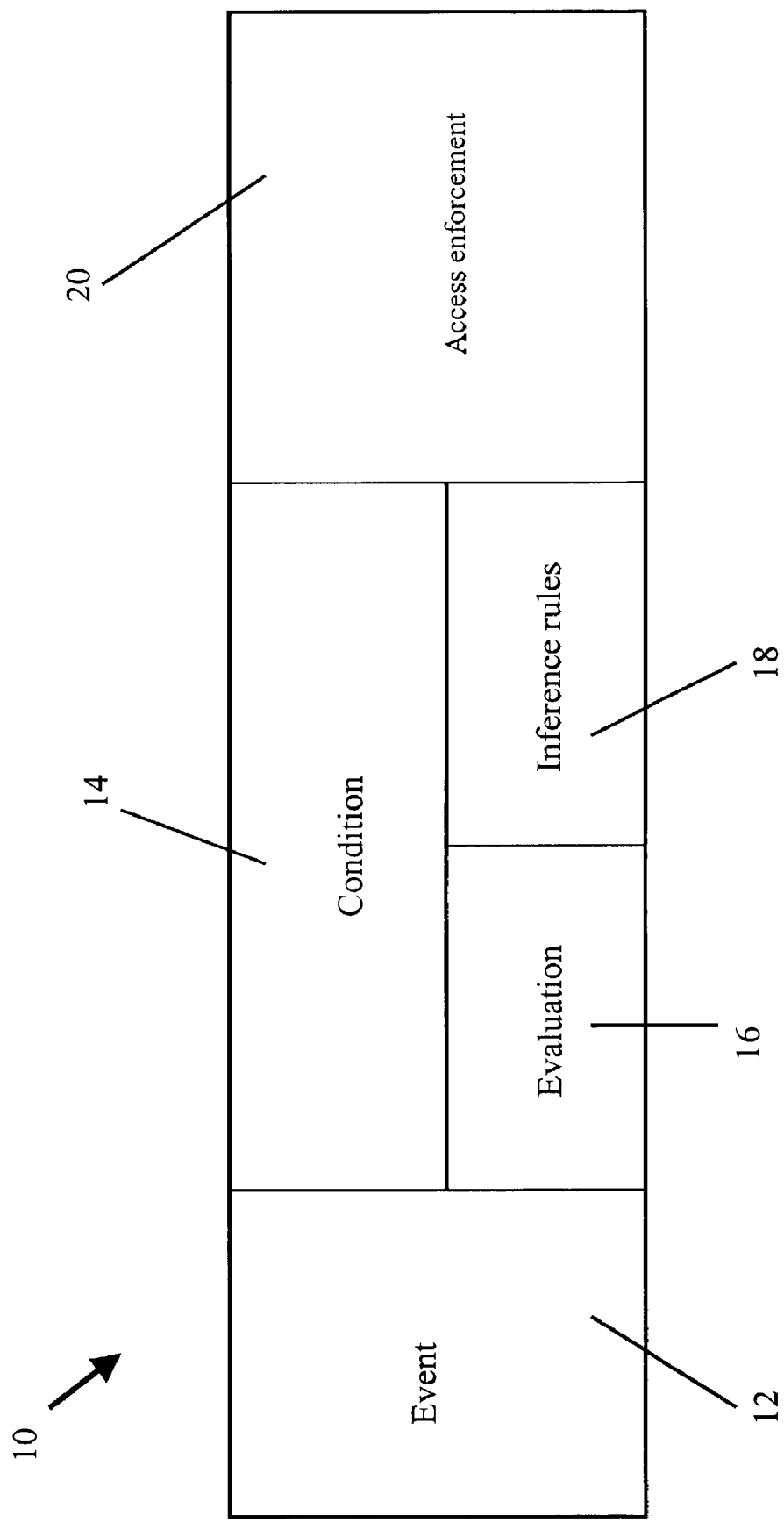
FIG. 1 is a diagrammatic representation of an access control policy model.

As shown in FIG. 1, an access control policy 10 consists of three parts:

Event: The event part 12 represents the condition that triggers the enforcement of the access control privileges specified in the access enforcement part 20 of the policy, subject to condition that the conditions attached with the policy hold true. Different kinds of events are supported, including temporal events, database events and events external to the system. Event expiration times dependent on the occurrence of other events in the access control system are also supported.

Condition: The condition part 14 of the policy definition can be divided into two sub-parts—

Condition Evaluation: The condition evaluation 16 defines the conditions that need to hold true after the event occurrence for the access enforcement 20 to be executed. These conditions can be defined on the database state, system information, or it can also include user-defined Boolean functions.

Inference Rule: Each condition can be coupled with a set of inference rules 18. These rules can be applied on data related to access control, user hierarchy, user profile etc. These access control rules are executed only if the associated condition evaluates to true. The results of these rules can be used in the access enforcement part 20 of the policy.

Access Enforcement: The access enforcement part 20 represents the access control actions (ie. enabling/disabling/modification/definition of access rights) that are executed if an event occurs and the associated conditions evaluate to true. The access enforcement part of the policy has parameters than can be instantiated by values obtained from the inference rules 18. These parameters can also be instantiated by other entities like database values, external system values etc.

The events, evaluation process, inference rules and enforcement actions will be described further below. Table 1 gives a simplified example of an access policy.

TABLE 1

| Event | Condition Evaluation | Inference Rule | Access Enforcement |
|---|---|---|---|
| There is an insertion in the transaction database | The user is of type "GOLD" & the total transaction amount done by the user within last 2 months is greater than $10,000 | No inference Rule | Grant access to the stock analysis data for the last six months to the gold customer |
| If there is an insertion in the customer transaction database | No Condition/ TRUE | Find the total business done by the customer and return it as a parameter | If the parameter value > $1000 grant the user access to the stock analysis data for the last 1 month If the parameter value > $5000 then grant the user access to the stock analysis data for the last 6 months. |

Database Access Execution

Figure 2:
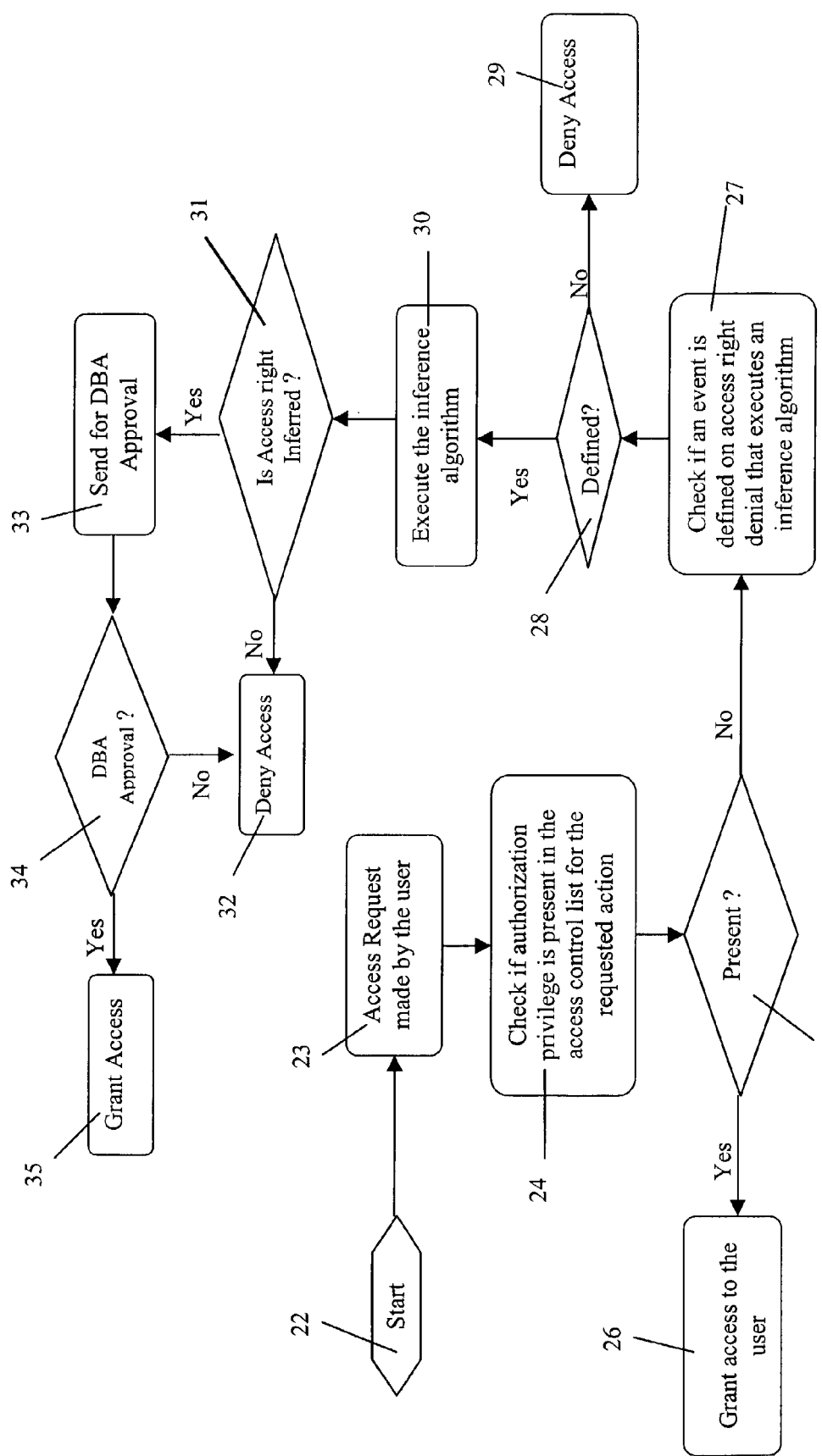
FIG. 2 is a logic flow diagram of handling of a database access request.

FIG. 2 is a flow diagram demonstrating, in broad terms, how database access execution is performed. The process commences with step 22. In step 23, an access request is made by a user. The user's request will be in relation to a specific action (eg. insertion, deletion, modification and reading of data). In step 24, a check is made of whether an authorisation privilege is present in the access control list for the requested action. From step 25 the flow progresses to step 26 if the authorisation privilege is present, in which case the user is granted access. Otherwise, the flow proceeds to step 27 and a check is made of whether the event is defined contingent upon the execution of an inference algorithm. From step 28 the flow proceeds to step 29 to deny the user access if not so defined, otherwise the flow proceeds to step 30 for execution of the inference algorithm. In step 31 it is tested whether the access right can be inferred. If No, then, in step 32, the access request is denied. If, however, the access right is inferred, then in step 33 the access request is sent to the DBA for approval. In step 34 the DBA approval is checked. If the approval is not given then the flow proceeds once again to step 32 where access is denied. Otherwise, if the DBA gives approval then the flow proceeds to step 35 where access is granted.

Specific Database Access System Embodiment

Figure 3:
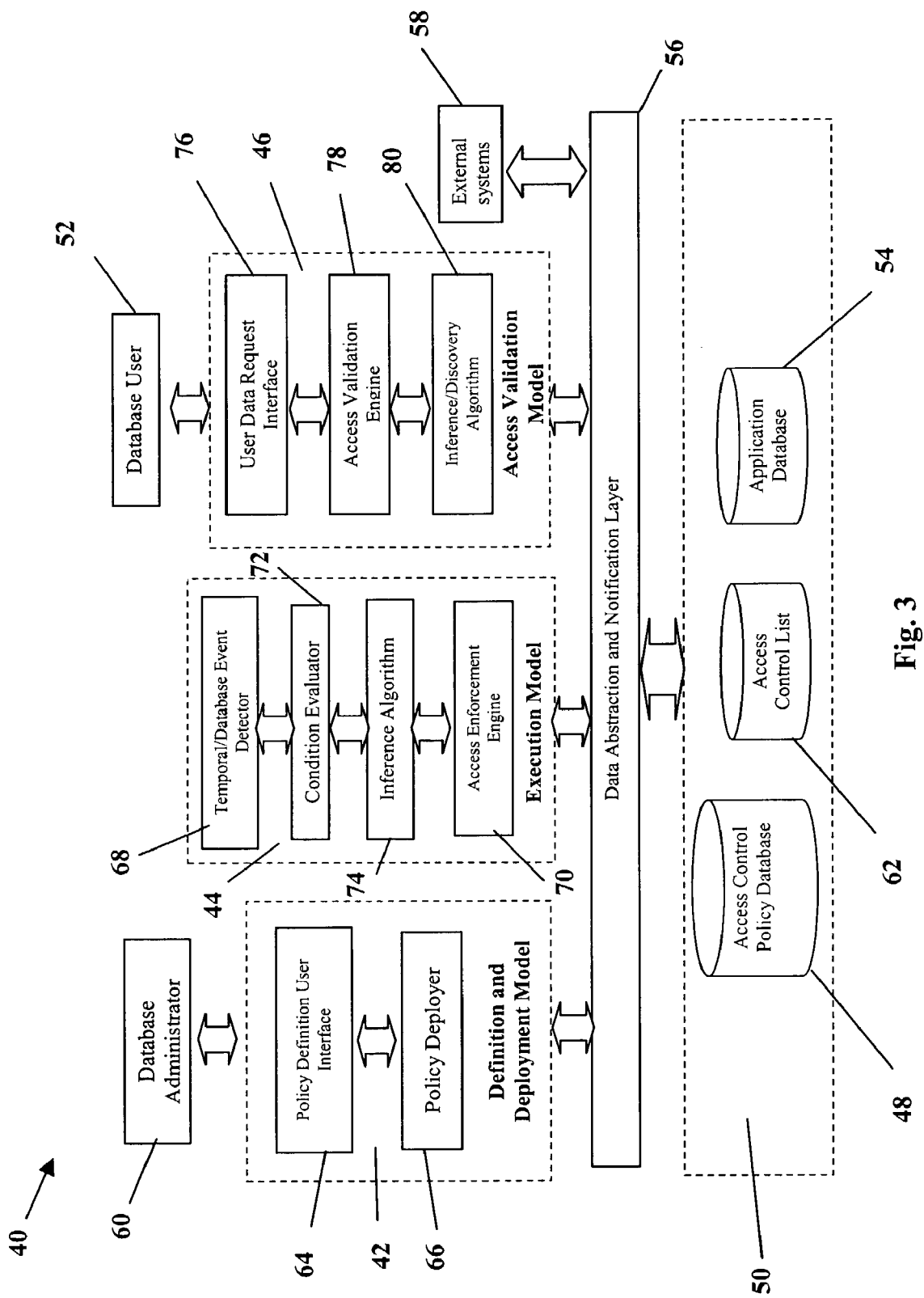
FIG. 3 is a schematic diagram of a database architecture embodying the invention.

A database system 40 embodying the invention is shown in FIG. 3. The system 40 consists of three parts—the Definition and Deployment Model 42, the Execution Model 44 and the Access Validation Model 46.

The Definition and Deployment Model 42 is used for the definition of the access control policy 10 and its deployment as a component 48 within the database 50. The Execution Model 44 detects the occurrence of events. It also checks the truth-value of the conditions attached to the policies and depending on the truth-value, it executes the inference rules 18 as well as the access enforcement part 20 of the policy 10. The Access Validation model 46, provides an interface to the end-users 52 to access data from the underlying databases or information repositories 54.

A Data Abstraction and Notification Layer 56 provides an interface to the underlying database 50. It also helps in the detection of events defined on the databases. The models 42, 44, 46 use this layer for communication with the database 50. The Data Abstraction and Notification Layer 56 also provides an interface for various external systems 58.

A Database Administrator 60 has an interface with the Definition and Deployment Model 42. The policies defined by the DBA 60 are stored in an Access Control Policy database 48, whereas the policies that are to be enforced on the Application database 54 are stored in the "Access Control List" 62.

The Policy Definition User Interface 64 of the Definition and Deployment Model 42 allows the DBA 60 to define policies in an event-condition-access enforcement format. It also allows the DBA 60 to define the inference rules 18 of the policy 10. The system 40 supports the definition of referential access type, wherein access is allowed on a data object, if a user 52 (or the same user) has an access privileges on some other (or same) data object. Such policies can be represented by defining an event marked by insertion/modification of an access right in the access control list and checking the access rights of the user on the referred data object in the condition part 14 of the policy 10.

The system 40 also allows the definition of "Indirect Read" access, which is an access privilege less than "Read" access. If a user 52 has Indirect Read access on an object he/she can read that object using functions defined with the access control system. Indirect Read access can be represented like any other access privilege within the access control policy 10. The policy defined by the DBA 60 is fed to the policy deployer 66, which converts it into an internal storage format and stores it in the Policy database 48 using the Data abstraction and Notification layer 56.

The Execution Model 44 detects the occurrence of events, validates the conditions and performs the access enforcement part 20 of the access control policy 10. The Data Abstraction and Notification layer 56 helps the Execution Model 44 to detect the database events. The Temporal/Database Event Detector 68 incorporates functionality to detect temporal events. Events from external systems 58 are notified to the Data Abstraction and Notification layer 56, which communicates this information to the Execution Model 44. If an event occurrence is detected, the Condition Evaluator 72 evaluates the conditions 14 associated with the policy 10. If the condition evaluates to true, the Inference Algorithm 74 executes the inference rules 18 attached with the condition. The data returned by the Condition Evaluator 72 and the Inference Algorithm 74 is fed to the Access Enforcement engine 70. If the action is parameterised, then the Access Enforcement Engine instantiates the parameters with the help of the data passed to it by the Condition Evaluator 72 and the Inference Algorithm 74. The Access Enforcement Engine 70 can instantiate the parameters using values obtained from other sources such as database or system data. The Access Enforcement Engine 70 performs the access enforcement actions such as modification of privileges, definition of new privileges, and enabling/disabling of access privileges by making changes in the Access Control List 62.

The Access Validation Model 46 validates all the user data access requests against the access privileges applicable for the user. The User Data Request Interface 76 allows the user 52 to access or query data from the underlying databases 54. The Access Validation Engine 78 validates these access requests against the access privileges present in the Access Control List 62. If an access request does not have an authorising privilege in the Access Control List 62, then the Access Validation Engine 78 invokes the inference/discovery algorithm 80 to determine whether access can be granted by inferring or discovering some access privileges. The Inference/Discovery Algorithm 80 acts on the data provided to it (which can be users' access privileges, employee hierarchy, users' profile, users click history, users transaction history) to infer the access privileges for the user. This inference/discovery process will be described in greater detail below.

SPECIFIC EXAMPLES

Specific components of the general access control methodology just described will now be considered in greater detail.

Inferring an Authorisation Privilege

Paraphrasing what was described in FIG. 2, if the Inference/Discovery Algorithm 80 can successfully infer the access right for the requested action, then this access privilege is given to the access coordinator or DBA 60 for validation. Once the DBA 60 validates the access privilege, the user 52 is granted access on the requested data (ie. read, write or indirect read). The Access Validation Model 46 executes the user request on the underlying data using the Data Abstraction and Notification layer 56 and returns the data to the user 52. If access is not granted, then the system flags an error to the user 52.

Consider the following examples of the inferencing process:

Example 1

Consider two companies A and B, where company A acquires the company B. As a result the databases of both the companies are merged. The access privileges need to be defined for the employees of company A on the database of company B and vice versa. The input to the Inference Algorithm 80 will consist of the hierarchy of users of both the organisations and the mapping of the hierarchy of one organisation with the other. If role R of company A maps to role R' of company B, then the algorithm can suggest to the DBA 60 that the access rights of role R can be given to the users belonging to role R' and vice versa, if it does not lead to a conflict. The pseudo-code algorithm for this procedure is given below:

Input: $U^A$: $\{U^A_1, U^A_2, \ldots, U^A_N\}$ Set of users of Organisation A $U^B$: $\{U^B_1, U^B_2, \ldots, U^B_N\}$ Set of users of Organisation B $R^A$: $\{R^A_1, R^A_2, \ldots, R^A_Q\}$ Set of roles of Organisation A $R_B$: $\{R^B_1, R^B_2, \ldots, R^B_Q\}$ Set of roles of Organisation B $U_{R^A_i}$: $\{U^A_j, U^A_k, \ldots, U^A_p\}$ Set of users who belong to role $R^A_i$.

$U_{R^B_i}$: $\{U^B_j, U^B_k, \ldots, U^B_p\}$ Set of users who belong to role $R^B_i$.

$R^A_i$: $\{ar^A_1, ar^A_2, \ldots, ar^A_k\}$ Set of access rights of role $R^A_i$ $R^B_i$: $\{ar^B_1, ar^B_2, \ldots, ar^B_k\}$ Set of access rights of role $R^B_i$ M: $\{(R^A_i, R^B_j) \mid$ Role $R^A_i$ of organization A maps to Role $R^B_j$ of organization B$\}$ Mapping between roles of the two organizations.

Algorithm:
  $\forall R^A_i \epsilon R^A$ do
    if $\exists$ $(R^A_i, R^B_k) \epsilon M$ do
      $\forall$ $ar^B_1 \epsilon R^B_k$ find if $ar^B_1 \cup R^A_i$ leads to a conflict
      If no add $ar^B_1$ to $R^A_i$
  $\forall R^B_k \epsilon R^B$ do
    if $\exists$ $(R^A_j, R^B_k) \epsilon M$ do
      $\forall$ $ar^A_1 \epsilon R^A_j$ find if $ar^A_1 \cup R^B_k$ leads to a conflict
      If no add $ar^A_1$ to $R^B_k$ Example 2

Consider a case where a new role $R_1$ is being added to the set of roles of an organisation. The set of access rights $ar_i \epsilon R_1$ is not completely defined. The inference Algorithm 80 can mine the access rights database of the organisation using association rules mining algorithms. One such algorithm is taught by Rakesh Agarwal and Ramakrishnan Srikant, in "Fast Algorithms for Mining Association Rules" in the proceedings of 20th International Conference on Very Large Databases, 1994), the contents of which are incorporated herein by cross-reference. These algorithms infer association rules or inference rules from the database, which represent associations or patterns between the different access rights in the organisation. The patterns that the inference algorithm is interested in are of the form "If access right ark is granted to the users of role R then 90% of times the users also have access right $ar_p$". Such patterns can be found out by scanning the data or by running standard association rule mining algorithms.

Formally, the association rules will be of the form ($ar_k$, $ar_p$, S) which signifies that if $ar_k \epsilon R_f$ then $ar_p \epsilon R_f$ with support "S". The association rules represent patterns that appear in the access rights database of the organization. The inference rule is based on the logic that if a pattern like ($ar_k$, $ar_p$, S) is present in the access rights database, then the chances of such a pattern repeating itself in the new role is also high. Hence using these association rules and access rights $ar_i$ that have been defined for role $R_1$, the Inference Algorithm can suggest new access rights if there exists an association rule of the form ($ar_i$, $ar_j$, S) and if $ar_j \cup R_i$ does not lead to a conflict. The pseudo code algorithm for this procedure is given below—

Input: New role $R_1$ to be added to the role hierarchy
Partial set of access rights $ar_i \epsilon R_1$
R: $\{R_1, R_2, \ldots, R_N\}$ Set of roles of the Organisation
$R_i$: $\{ar_1, ar_2, \ldots, ar_k\}$ Set of access rights of role $R_i$ Algorithm:
Using some standard association rules or mining algorithm mine the set of access rights of all roles
Let A=$\{a_1, a_2, \ldots, a_c\}$ be the set of association rules returned by the algorithm where $a_i = \{ar_i, ar_j, \text{support}\}$ is an association rule
Let $R' \subset R_1$ be the set of access rights that match the association rule antecedent
For each $ar_i' \epsilon R'$ do
  Find if $ar_j' \cup R_1$ leads to a conflict, where ($ar_i, ar_j$, support)$\epsilon$A
  If no conflict is detected add $ar_j'$ to $R_1$ and
  Check if $ar_j'$ matches any of the association rules' antecedent
  If yes add $ar_j'$ to R'

Example 3

A different scenario where the above procedure can be used is when the access rights of a new organisation are being defined. If a company wants to start a sister enterprise, then the access rights of the new company are generally modelled on the access rights of the parent company. The Inference Algorithm 80 can mine the access rights database of the parent company and generate association rules based on the occurrence pattern of access rights. The patterns that the inference algorithm is interested in are of the form "If access right $ar_k$ is granted to the users of role R then 90% of times the users also have access right $ar_p$". Such patterns can be found out by scanning the data or by running standard association rule mining algorithms. These association rules can be used to suggest access rights for the new organisation. The database administrator 60 can define a few access rights for the roles of the new organisation. Based on these access rights and the association rules, the inference algorithm can suggest new access rights to the database administrator 60 (as was done in the earlier case). The pseudo code algorithm is given below:

Input: Let company A be the parent company and company B be the sister concern for whom the access rights are to be defined.
$R^A$: $\{R^A_1, R^A_2, \ldots, R^A_k\}$ Set of roles of company A
$ar^A_k$: $\{ar^A_1, ar^A_2, \ldots, ar^A_m\}$ Set of access rights $\epsilon R^A_k$
$R^B$: $\{R^B_1, R^B_2, \ldots, R^B_L\}$ Set of roles of new organisation Algorithm:
Run the association rule mining algorithms on $R^A$
Let A=$\{a_1, a_2, \ldots, a_c\}$ be the set of association rules returned by the algorithm where
$a_i = \{ar^A_j, ar^A_1, \text{support}\}$ is an association rule
For each $R^B_j \epsilon R^B$ do
  For each $ar^B_p \epsilon R^B_j$ do
    If $\exists a_i = \{ar^A_k, ar^A_o, \text{support}\}$ & $a_i \epsilon$ A & $ar^A_k = ar^B_p$ then
      Find if $ar^A_o \cup R^B_j$ leads to a conflict
      If there is no conflict suggest adding $ar^A_o$ to $R^B_j$ The same algorithm can also be used when the user makes an access request that does not have an access privilege attached. The procedure for this scenario is given below:

Step 1: The inference algorithm can mine the access rights of the organisation to find association rules. The format of the association rule will be: ($ar_i$, $ar_j$, S), which means that if a role R has access night $ar_i$, then the role also has access right $ar_j$ with support 'S'.

Step 2: If a user belonging to role R makes an access request $ar_p$ and the user does not have this access right in the set of rights belonging to his current role R, then the Inference Algorithm 80 can be used.

The Inference Algorithm is given below:
Input: R: $\{ar_1, ar_2, \ldots, ar_1\}$ Set of access rights associated with a role
A: $\{a_1, a_2, \ldots, a_m\}$ Set of association rules.
$a_k$: ($ar_i$, $ar_1$, support) association rule where $ar_i$, $ar_1$ are access rights.
$ar_p$: The access right that the user wants.

Algorithm:
For each access right $ar_k \epsilon R$ do
  If ($\exists a_j | a_j \epsilon A$ & $a_j = (ar_k, ar_p, \text{support})$) then
  If $ar_p \cup R$ does not lead to a conflict
  Suggest adding $ar_p$ to R Example 4

Consider an example from an online e-business enterprise. The users of an e-business are classified into different categories such as "gold", "silver", "platinum", depending on the amount of business given to the enterprise. The access privileges of the customers are based on the customer rating given to the user. The inference engine can be of considerable help to the DBA 60 by suggesting new access rights for users (beyond those identified by their customer rating) as a special incentive for the customers.

Figure 4:
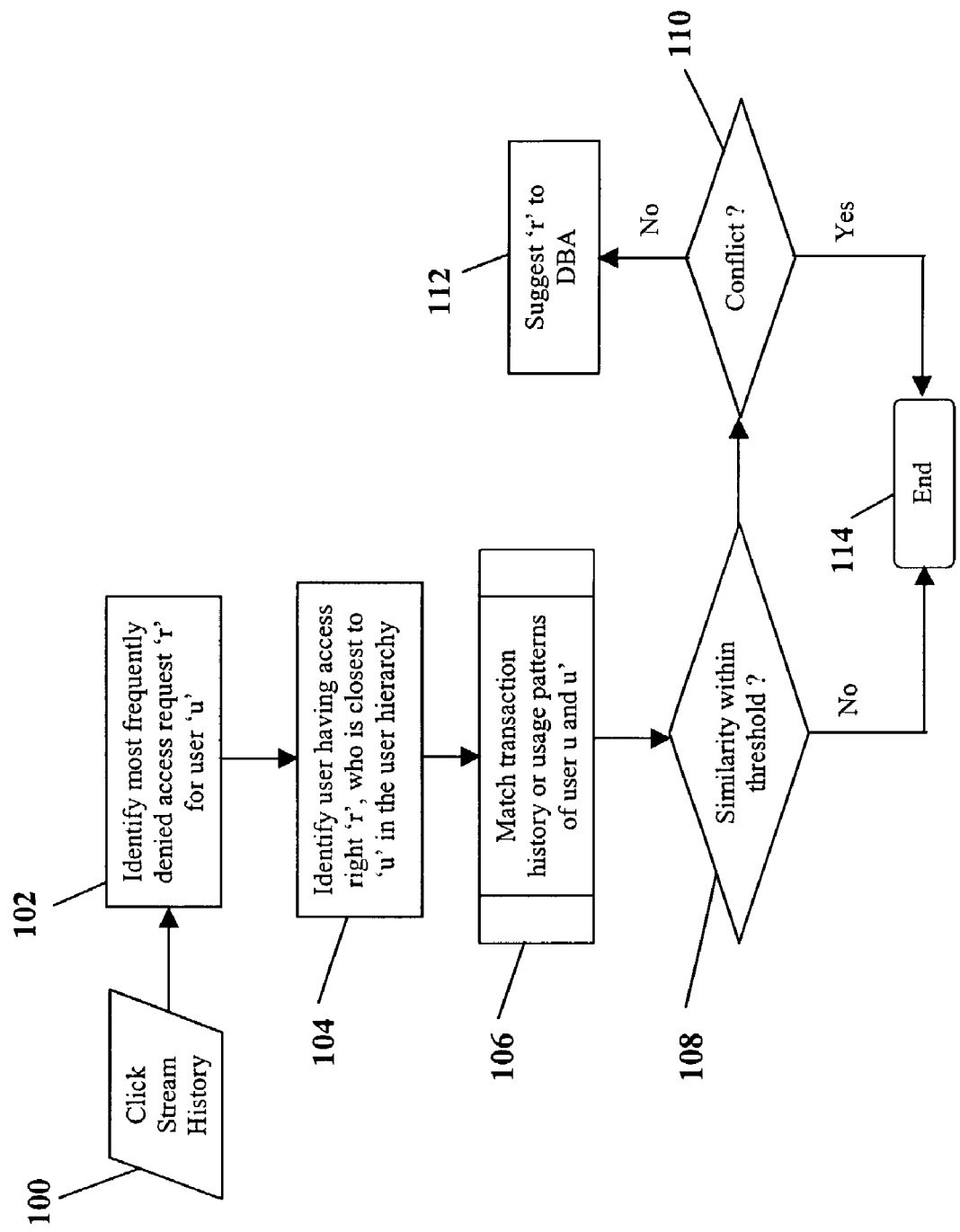
FIG. 4 is a logic flow diagram of one example of the inference of privileges.

Referring now to the flowchart of FIG. 4, the Inference Algorithm 80 scans through the customer click stream history (step 100) and identifies those access requests 'r' that are made frequently by the customer (say c') and are denied by the access control system (step 102). The Algorithm then identifies those customers 'C' who have access privilege (step 104). The Algorithm then matches the transaction history, user profile and usage patterns like the business given to the enterprise by the customer, number of items bought, type of items bought, customers referred to the enterprise of the customer c' and customer c$\epsilon$C (step 106). If the similarity between the two patterns is within a specified threshold (step 108), and if the r does not lead to a conflict between the access rights of customer c' (step 112), then the Inference Algorithm 80 suggests the addition of access right r to those of customer c (step 112), and ends (step 114).

In terms of the access policy 10, the components are:

TABLE 2

| Event | Condition Evaluation | Inference Rule | Access Enforcement |
|---|---|---|---|
| If a user makes an unsuccessful access request | No condition | Execute the inference algorithm and store the result returned by the DBA 60 as a parameter. | If the DBA 60 agrees to the inference, grant the access right to the user in the policy database 48. |

Changing Access Rights

The occurrence of events affects a user's access rights, as explained previously. Consider the following examples.

Case 1

Stated Policy: When an employee goes on leave, his access rights to confidential documents should be disabled.

Corresponding ECA policy:

TABLE 3

| Event | Condition Evaluation | Inference Rule | Access Enforcement |
|---|---|---|---|
| An entry is made in the "Leave Database". | No condition | None | Remove all access privileges for the employee (whose entry is made in the employee database) of type confidential. |

Therefore, whenever any entry is made in the Leave Database automatically the above policy is executed and the access rights of the employee on confidential data are disabled.

Case 2

Stated Policy: A gold user is allowed to access the stock analysis data for the last six months, if the user has done transactions worth $10,000 in the last two months or if the cumulative sum of the transactions done by all the customers referred by the gold user is more than $ 50,000.

There will be two corresponding policies:

Policy 1

TABLE 4

| Event | Condition Evaluation | Inference Rule | Access Enforcement |
|---|---|---|---|
| If there is an insertion or updation in the transaction database | The user is of type "gold" & the total transaction amount within the last 2 months is greater than $10,000 | No inference rule | Add an access right granting access to the stock analysis data for the last six months for the gold customer. |

Policy 2

TABLE 5

| Event | Condition Evaluation | Inference Rule | Access Enforcement |
|---|---|---|---|
| If there is an insertion or updation in the transaction database | The user is referred by a gold customer & the total transaction amount of all the customers referred by the gold customer is greater than $50,000/– | No inference rule. | Add an access right granting access to the stock analysis data for the last six months for the gold customer. |

Parameterised Actions

It was earlier stated that database access control policies can be parameterised. Examples of this will now be described.

Stated Policy: A customer is given access to the stock analysis data based on the following contingent conditions:

1) If the user has done business greater than $ 1,000 then he has access to stock analysis data for the last 1 month
2) If the user has done business greater than $ 10,000 then he has access to the stock analysis data for the last 6 months
3) If the user has done business greater then $ 50,000 then he has access to the stock analysis data for the last 1 year.

The ECA policy is:

TABLE 6

| Event | Condition Evaluation | Inference Rule | Access Enforcement |
|---|---|---|---|
| If there is an insertion in the customer transaction database | No condition evaluation/TRUE | Find the total business done by the customer and return it as a parameter | If the parameter value > $1,000 then give access to the user to stock analysis data for the last 1 month. If the parameter value > $10,000 then give access to the user to stock analysis data for the last 6 months. If the parameter value > $50,000 then give access to the user to stock analysis data for the last 1 year. |

Access Privileges

Also as previously described, the full set of access privileges is {read, write, indirect read}. Examples for each are now given.

Indirect Read

Stated Policy: A guest user is allowed indirect access on the stocks database (but not the entire database).

The functions defined in the system could include: top five gainers and top five losers'. The guest user can use these functions on the stocks database and read the results, but the user cannot directly access the database. Thus a guest user can only view the top five gainers and losers', but not the entire database. Hence the access privilege of guest user is less than "read".

Read

Stated Policy: A manager is allowed to read the employee name in the Leave database after a leave application is made by any of his direct reportees'.

TABLE 7

| Event | Condition Evaluation | Inference Rule | Access Enforcement |
| --- | --- | --- | --- |
| An entry is made in the leave database | No condition/TRUE | Find the manager of the employee who has made the leave application and pass it as a parameter | Grant read access to the employee name field of the leave database to the manager passed as a parameter to the leave database. |

Write

Stated Policy: A manager is allowed to write/edit the approval status in the Leave database after a leave application is made by any of his direct reportees'.

TABLE 8

| Event | Condition Evaluation | Inference Rule | Access Enforcement |
| --- | --- | --- | --- |
| An entry is made in the leave database | No condition/TRUE | Find the manager of the employee who has made the leave application and pass it as a parameter | Grant write access to the approval status field of the leave database to the manager passed as a parameter to the leave database. |

Computer Hardware and Software—User

Figure 5:
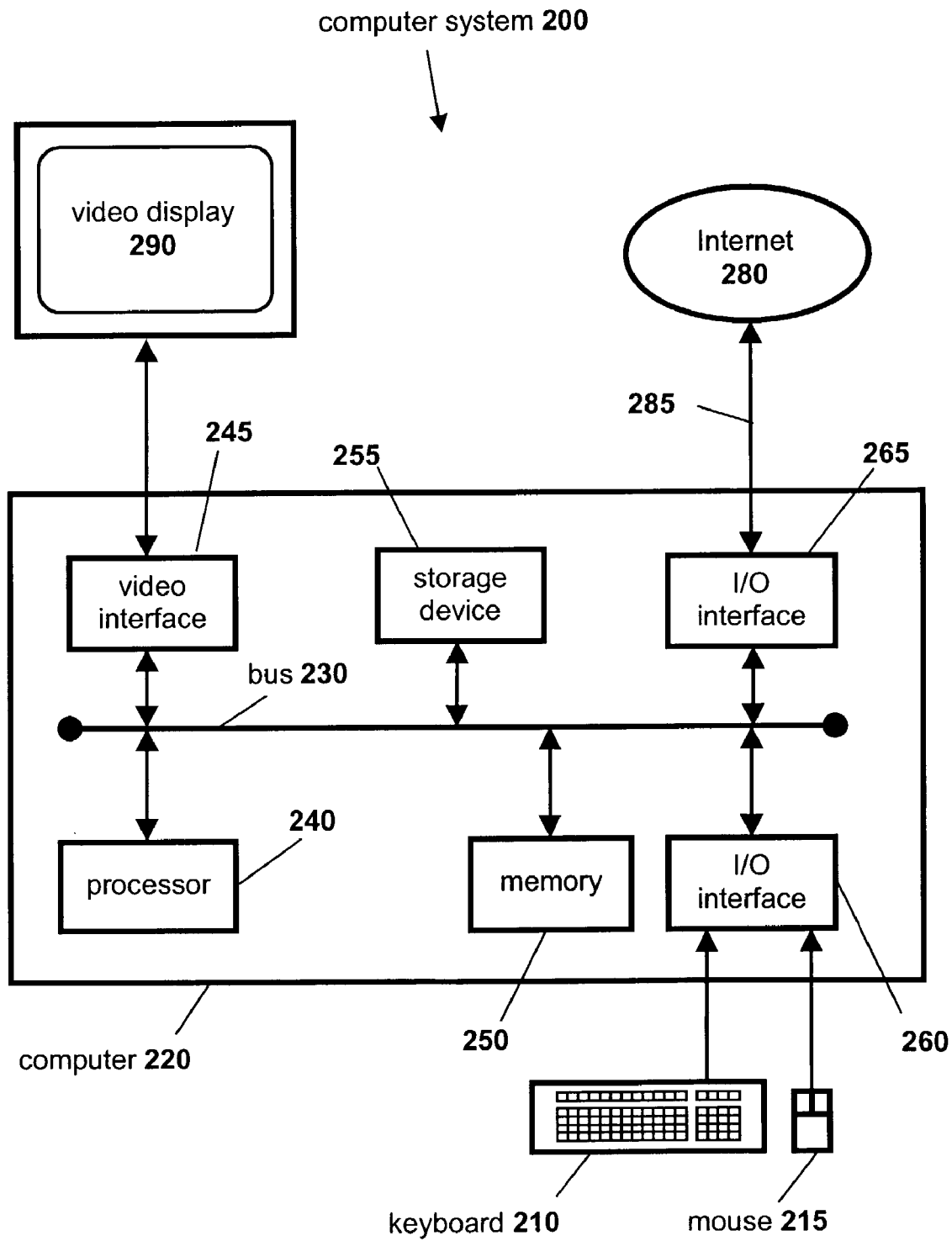
FIG. 5 is a schematic representation of a computer system suitable for performing the techniques described with reference to FIGS. 1 to 4.

FIG. 5 is a schematic representation of a computer system 200 that can be used to perform steps in a process that implement the techniques described herein. The computer system 200 is provided for executing computer software that is programmed to assist in performing the described techniques. This computer software executes under a suitable operating system installed on the computer system 200.

The computer software involves a set of programmed logic instructions that are able to be interpreted by the computer system 200 for instructing the computer system 200 to perform predetermined functions specified by those instructions. The computer software can be an expression recorded in any language, code or notation, comprising a set of instructions intended to cause a compatible information processing system to perform particular functions, either directly or after conversion to another language, code or notation.

The computer software is programmed by a computer program comprising statements in an appropriate computer language. The computer program is processed using a compiler into computer software that has a binary format suitable for execution by the operating system. The computer software is programmed in a manner that involves various software components, or code means, that perform particular steps in the process of the described techniques.

The components of the computer system 200 include: a computer 220, input devices 210, 215 and video display 290. The computer 220 includes: processor 240, memory module 250, input/output (I/O) interfaces 260, 265, video interface 245, and storage device 255.

The processor 240 is a central processing unit (CPU) that executes the operating system and the computer software executing under the operating system. The memory module 250 includes random access memory (RAM) and read-only memory (ROM), and is used under direction of the processor 240.

The video interface 245 is connected to video display 290 and provides video signals for display on the video display 290. User input to operate the computer 220 is provided from input devices 210, 215 consisting of keyboard 210 and mouse 215. The storage device 255 can include a disk drive or any other suitable non-volatile storage medium.

Each of the components of the computer 220 is connected to a bus 230 that includes data, address, and control buses, to allow these components to communicate with each other via the bus 230.

The computer system 200 can be connected to one or more other similar computers via a input/output (I/O) interface 265 using a communication channel 285 to a network 280, represented as the Internet.

The computer software program may be provided as a computer program product, and recorded on a portable storage medium. In this case, the computer software program is accessed by the computer system 200 from the storage device 255. Alternatively, the computer software can be accessed directly from the network 280 by the computer 220. In either case, a user can interact with the computer system 200 using the keyboard 210 and mouse 215 to operate the programmed computer software executing on the computer 220.

The computer system 200 is described for illustrative purposes: other configurations or types of computer systems can be equally well used to implement the described techniques. The foregoing is only an example of a particular type of computer system suitable for implementing the described techniques.

CONCLUSION

A method, a computer system and computer software are described herein in the context of executing event-based database access requests. The problem of an access request not having an explicit authorisation privilege is addressed by inferring a privilege. The inference can be performed by mining or derived from data associated with the requesting user.

A particular advantage of inferring access privileges is that the task of a database administrator is simplified. Another advantage flows to users, in that access requests are less likely to be refused. This is very useful in large-scale database systems, having many users who change regularly.

The proposal of an event-based access control system with the ability to infer access rights allows a database administrator to grant the correct access privileges to a user at the correct point in time, thereby avoiding the need to grant superfluous access rights. Specifying the access control policy in terms of a 'event-condition-access enforcement rules' model better capture intended policies. By associating the inference process with the condition part of the access control policy representation and, depending upon the truth-value of the condition, enabling parameterised actions, it is possible to achieve intelligent policies not available in the prior art.

Various alterations and modifications can be made to the techniques and arrangements described herein, as would be apparent to one skilled in the relevant art.

We claim:

1. A method of executing event-based database access requests, said method comprising:

establishing an access control policy comprising a set of events, wherein each of said events is capable of leading to a change of access rights in an access rights database;

receiving a database access request from a user;

determining whether said request includes an explicit authorization privilege;

inferring an authorization privilege if said explicit authorization privilege is absent;

inferring any of association rules and inference rules from said access rights database representing patterns between different access rights granted in an organization;

verifying an inferred authorization privilege; and executing said access request, wherein said step of inferring an authorization privilege includes algorithmically mining occurrence patterns of access rights from existing user records, and wherein if a similarity between two patterns is within a specified threshold, said mining suggesting or inferring access rights be granted to said user.

2. The method of claim 1, wherein the step of inferring an authorization privilege includes a derivation from data associated with said user.

3. The method of claim 2, wherein said data includes any of a place in a hierarchy, a profile, a click history, a transaction history, and a role.

4. The method of claim 1, wherein said step of inferring an authorization privilege is performed within an access control policy comprising a set of events, and wherein each of said events comprises at least one condition evaluation and associated inference rules, and access enforcement actions.

5. The method of claim 4, wherein said access enforcement actions are parameterized.

6. A method of executing event-based database access requests within an access control policy having a set of events, wherein each of said events comprises at least one condition evaluation and associated inference rules, and an access enforcement action, the method comprising:

establishing said access control policy comprising said set of events, wherein each of said events is capable of leading to a change of access rights in an access rights database;

receiving a database access request from a requesting user;

assessing an applicable event;

evaluating said condition evaluations against said request;

determining whether said request includes an explicit authorization privilege;

inferring an authorization privilege if said explicit authorization privilege is absent;

inferring any of association rules and inference rules from said access rights database representing patterns between different access rights granted in an organization;

verifying an inferred authorization privilege; and executing a relevant said enforcement action, wherein said step of inferring an authorization privilege includes algorithmically mining occurrence patterns of access rights from existing user records, and wherein if a similarity between two patterns is within a specified threshold, said mining suggesting or inferring access rights be granted to said user.

7. The method of claim 6, wherein the step of inferring an authorization privilege includes a derivation from data associated with said requesting user.

8. The method of claim 7, wherein said data includes any of a place in a hierarchy, a profile, a click history, a transaction history, a and role.

9. A database system having event-based access, the system comprising:

a user input interface operable to receive user access requests;

a database;

an access control policy comprising a set of events, wherein each of said events is capable of leading to a change of access rights in said access rights database;

an algorithmic mechanism adapted to infer any of association rules and inference rules from said access rights database representing patterns between different access rights granted in an organization;

a database administrator tat verifies an inferred authorization privilege; and a processor controlling execution of user access requests to said database, and wherein, in response to a said access request, said processor is operable to determine whether said request includes an explicit authorization privilege, infers an authorization privilege if said explicit authorization privilege is absent, and executes said access request, wherein said processor infers said authorization privilege by algorithmically mining occurrence patterns from existing user records, and wherein if a similarity between two patterns is within a specified threshold, said mining suggesting or inferring access rights be granted to said user.

10. The database system of claim 9, wherein the processor infers an authorization privilege derived from data associated with said requesting user.

11. The database system of claim 10, wherein the processor operates on data including any of a place in a hierarchy, a profile, a click history, a transaction history, and a role.

12. The database system of claim 9, further comprising a database administrator that verifies an inferred authorization privilege before said processor executes said access request.

13. A database system having event-based access within an access control policy having a set of events, said set of events comprising at least one condition evaluation and associated inference rules, and access enforcement actions said database system, comprising:

a user input interface by which a requesting user access requests are received;

a database;

an access control policy comprising a set of events, wherein each of said events is capable of leading to a change of access rights in said access rights database;

an algorithmic mechanism adapted to infer any of association rules and inference rules from said access rights database representing patterns between different access rights granted in an organization;

a database administrator that verifies an inferred authorization privilege; and a processor controlling execution of user access requests to said database, and wherein, in response to an access request, the processor assesses an applicable event, and for the applicable event, evaluates said condition evaluation against said request, determines whether said request includes an explicit authorization privilege, infers an authorization privilege if said explicit authorization privilege is absent, and executes a relevant said enforcement action, wherein said processor infers an authorization privilege by algorithmically mining occurrence patterns from existing user records, and wherein if a similarity between two patterns is within a specified threshold, said mining suggesting or inferring access rights be granted to said user.

14. The database system of claim 13, wherein the processor infers an authorization privilege derived from data associated with said requesting user.

15. The database system of claim 14, wherein the processor operates on data comprising any of a place in a hierarchy, a profile, a click history, a transaction history, and a role.

16. A program storage device comprising computer software recorded on said program storage device and able to be executed by a computer system capable of interpreting the computer software, for performing a method of event-based database requests, the method comprising:

establishing an access control policy comprising a set of events, wherein each of said events is capable of leading to a change of access rights in an access rights database;

receiving a database access request from a user;

determining whether said request includes an explicit authorization privilege, inferring an authorization privilege if said explicit authorization privilege is absent;

inferring any of association rules and inference rules from said access rights database representing patterns between different access rights granted in an organization;

verifying an inferred authorization privilege; and executing said access request, wherein said step of inferring an authorization privilege includes algorithmically mining occurrence patterns of access rights from existing user records, and wherein if a similarity between two patterns is within a specified threshold, said mining suggesting or inferring access rights be granted to said user.

17. The program storage device of claim 16, wherein said step of inferring an authorization privilege comprises performing a derivation from data associated with said user.

18. The program storage device of claim 17, wherein said data includes data comprises any of a place in a hierarchy, a profile, a click history, a transaction history, and a role.

19. A program storage device readable by machine, tangibly embodying a program of instructions executable by said machine to perform a method for executing event-based database access requests within an access control policy having a set of events, wherein said events comprises at least one condition evaluation and associated inference rules, and access enforcement actions, said method comprising:

establishing an access control policy comprising a set of events, wherein each of said events is capable of leading to a change of access rights in an access rights database;

receiving a database access request from a requesting user;

assessing an applicable event, and for the applicable event, evaluating said condition evaluations against said request;

determining whether said request includes an explicit authorization privilege;

inferring an authorization if said explicit authorization privilege is absent;

inferring any of association rules and inference rules from said access rights database representing patterns between different access rights granted in an organization;

verifying an inferred authorization privilege; and executing a relevant said enforcement actions, wherein said step of inferring an authorization comprises performing an algorithmically mining of occurrence patterns from existing user records, and wherein if a similarity between two patterns is within a specified threshold, said mining suggesting or inferring access rights be granted to said user.

20. The program storage device of claim 19, wherein in said method, said step of inferring an authorization privilege comprises performing a derivation from data associated with said requesting user.

21. The program storage device of claim 20, wherein said requesting user data comprises any of a place in a hierarchy, a profile, a click history, a transaction history, and a role.

* * * * *